(12) United States Patent
Wegelin et al.

(10) Patent No.: US 8,960,498 B2
(45) Date of Patent: Feb. 24, 2015

(54) TOUCH-FREE DISPENSER WITH SINGLE CELL OPERATION AND BATTERY BANKING

(75) Inventors: Jackson W. Wegelin, Stow, OH (US); Chip W. Curtis, West Dundee, IL (US)

(73) Assignee: Gojo Industries, Inc., Akron, OH (US)

( * ) Notice: Subject to any disclaimer, the term of this patent is extended or adjusted under 35 U.S.C. 154(b) by 261 days.

(21) Appl. No.: 13/175,027

(22) Filed: Jul. 1, 2011

(65) Prior Publication Data

US 2013/0001250 A1  Jan. 3, 2013

(51) Int. Cl.
*B67D 7/06* (2010.01)
*H02J 1/10* (2006.01)
*H02J 7/00* (2006.01)
*H02M 3/155* (2006.01)

(52) U.S. Cl.
CPC ........... *H02J 1/10* (2013.01); *H02J 2007/0067* (2013.01); *H02J 7/0065* (2013.01); *H02M 3/155* (2013.01)
USPC .................. 222/52; 222/63; 222/333; 307/52

(58) Field of Classification Search
USPC ......... 222/52, 63, 333; 700/282, 297; 307/52; 4/263
See application file for complete search history.

(56) References Cited

U.S. PATENT DOCUMENTS

| | | | |
|---|---|---|---|
| 5,739,596 A * | 4/1998 | Takizawa et al. | 307/66 |
| 5,772,291 A | 6/1998 | Byrd et al. | 312/34.22 |
| 6,209,752 B1 | 4/2001 | Mitchell et al. | 222/63 |
| 6,268,711 B1 | 7/2001 | Bearfield | 320/117 |
| 6,467,651 B1 | 10/2002 | Muderlak et al. | 222/52 |
| 6,651,851 B2 | 11/2003 | Muderlak et al. | 222/333 |
| 6,695,246 B1 | 2/2004 | Elliott et al. | 242/564.1 |
| 6,710,606 B2 | 3/2004 | Morris | 324/658 |
| 6,826,455 B1 * | 11/2004 | Iott et al. | 700/297 |

(Continued)

FOREIGN PATENT DOCUMENTS

WO     WO 00/21178     4/2000

OTHER PUBLICATIONS

*Perpetual Environmentally Powered Sensor Networks*; Jiang et al; Computer Science Department—University of California, Berkley, The Fourth International Conference on Information Processing in Sensor Networks: Special Track on Platform Tools and Design Methods for Network Embedded Sensors IPSN 2005: 463-468; Apr. 25-27, 2005.

(Continued)

*Primary Examiner* — J. Casimer Jacyna
(74) *Attorney, Agent, or Firm* — Renner Kenner Greive Bobak Taylor & Weber

(57) ABSTRACT

An electrically powered device includes at least one electrically powered component and a power source having at least two cells. One cell powers the electrically powered component and the remaining cells are held in reserve. A control circuit is connected to the electrically powered component and the power source. The control circuit includes a controller which generates a charge signal, a boost regulator circuit connected to the controller which receives power from the power source and generates a boost signal for conversion into a charge signal. A capacitor is connected to the controller and receives the charge signal and provides a predetermined voltage to the electrically powered component. A boost regulator circuit and the controller monitor the power source and draw power from one of the remaining cells held in reserve when the cell is fully depleted.

11 Claims, 2 Drawing Sheets

(56) References Cited

U.S. PATENT DOCUMENTS

| | | | |
|---|---|---|---|
| 7,374,066 B2 | 5/2008 | Jackson et al. | 222/52 |
| 7,615,970 B1 * | 11/2009 | Gimlan | 320/166 |
| 7,737,581 B2 * | 6/2010 | Spurlin et al. | 307/66 |
| 2001/0013767 A1 | 8/2001 | Takemoto | 320/132 |
| 2004/0226962 A1 | 11/2004 | Mazursky et al. | 222/95 |
| 2005/0189819 A1 | 9/2005 | Maskatia et al. | 307/86 |
| 2008/0109956 A1 | 5/2008 | Bayley et al. | 4/623 |
| 2009/0026305 A1 | 1/2009 | Elliott et al. | 242/563.2 |
| 2010/0017041 A1 | 1/2010 | Bentivoglio | 700/283 |
| 2010/0168926 A1 | 7/2010 | Bayley et al. | 700/282 |
| 2012/0241470 A1 * | 9/2012 | Snodgrass et al. | 222/63 |

OTHER PUBLICATIONS

*Power Enhancement of an Actively Controller Battery/Ultracapacitor Hybrid*; Gao et al; IEEE Transactions on Power Electronics; vol. 20, No. 1, Jan. 2005, pp. 236-243.

International Search Report mailed Mar. 3, 2014 in corresponding application No. PCT/US2012/043049.

Written Opinion mailed Mar. 3, 2014 in corresponding application No. PCT/US2012/043049.

* cited by examiner

TOUCH-FREE DISPENSER WITH SINGLE CELL OPERATION AND BATTERY BANKING

TECHNICAL FIELD

Generally, the present invention is directed to an electrically powered touch-free fluid dispenser. In particular, the present invention provides a battery banking feature which ensures that one battery (cell) is fully depleted prior to switching over to a second battery (cell). Specifically, the present invention is directed to a battery operated touch-free fluid dispenser which utilizes a supercapacitor to operate a controller based system that provides consistent power to the dispenser until the battery is fully depleted whereupon the controller switches to another battery.

BACKGROUND ART

Hands-free, sometimes referred to as touch-free, dispensers are well known in the art. Many dispensers are battery powered which allows them to be conveniently placed most anywhere without connection to electrical service. Of course, batteries, also referred to as cells, run down over a period of time and this requires that the batteries be replaced. If a battery is not timely replaced then the dispenser is rendered inoperative. One way to overcome this problem is to replace the battery on a predetermined schedule. However, this is considered wasteful as the full life of the replaced battery is not used.

An alternative solution is to provide a battery backup system for the dispenser. In such a configuration, the dispenser switches to a second charged battery when the first-used battery is fully or partially discharged. Although an improvement, use of a battery in the last stages of its life can also be problematic. Specifically, the power levels provided by the almost depleted battery may not be adequate to fully operate the dispensing system, motor and/or pump that is used to dispense the fluid material. Accordingly, there may be dispensing cycles that last longer than are supposed to or the dispensing cycle may be intermittent. Another drawback of using multiple batteries requires that they be connected in series. As such, a controller associated with the dispenser chooses a battery with the highest voltage value to operate the device. This has the disadvantage of requiring batteries to be of the same type. When connected in series, the performance of a set of batteries is limited by the weakest cell. As such, mixing the different types of batteries (in series) can cause failure. Once one of the batteries discharges, it can start to charge in the opposite polarity and result in failure of the battery and possibly even the dispenser. In the past, attempts to differentiate battery types in a series configuration result in a difficult and complicated circuit. Therefore, there is a need for a hands-free or touch-free dispenser with a battery backup system that fully depletes one battery before switching over to a second battery. There is also a need to ensure that a full operational cycle is implemented regardless of the remaining charge value. And, there is a need to allow for different types of batteries to be used in the dispenser. There is also a need in the art to provide an indication as to which battery is fully depleted so that it can be replaced.

SUMMARY OF THE INVENTION

In view of the foregoing it is a first aspect of the present invention to provide a touch-free dispenser with single cell operation and battery banking.

It is another aspect of the present invention to provide an electrically powered device, comprising at least one electrically powered component, a power source comprising at least two cells, wherein at least one cell powers the electrically powered component and the remaining cells are held in reserve; and a control circuit connected to the at least one electrically powered component and the power source, the control circuit comprising a controller generating a charge signal, a boost regulator circuit connected to the controller and receiving power from the power source and generating a boost signal received by the controller for conversion into the charge signal, and a capacitor connected to the controller and receiving the charge signal therefrom, the capacitor providing a predetermined voltage to the electrically powered component, the boost regulator circuit and the controller monitoring the power source and drawing power from at least one of the remaining cells held in reserve when the one cell is fully depleted.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
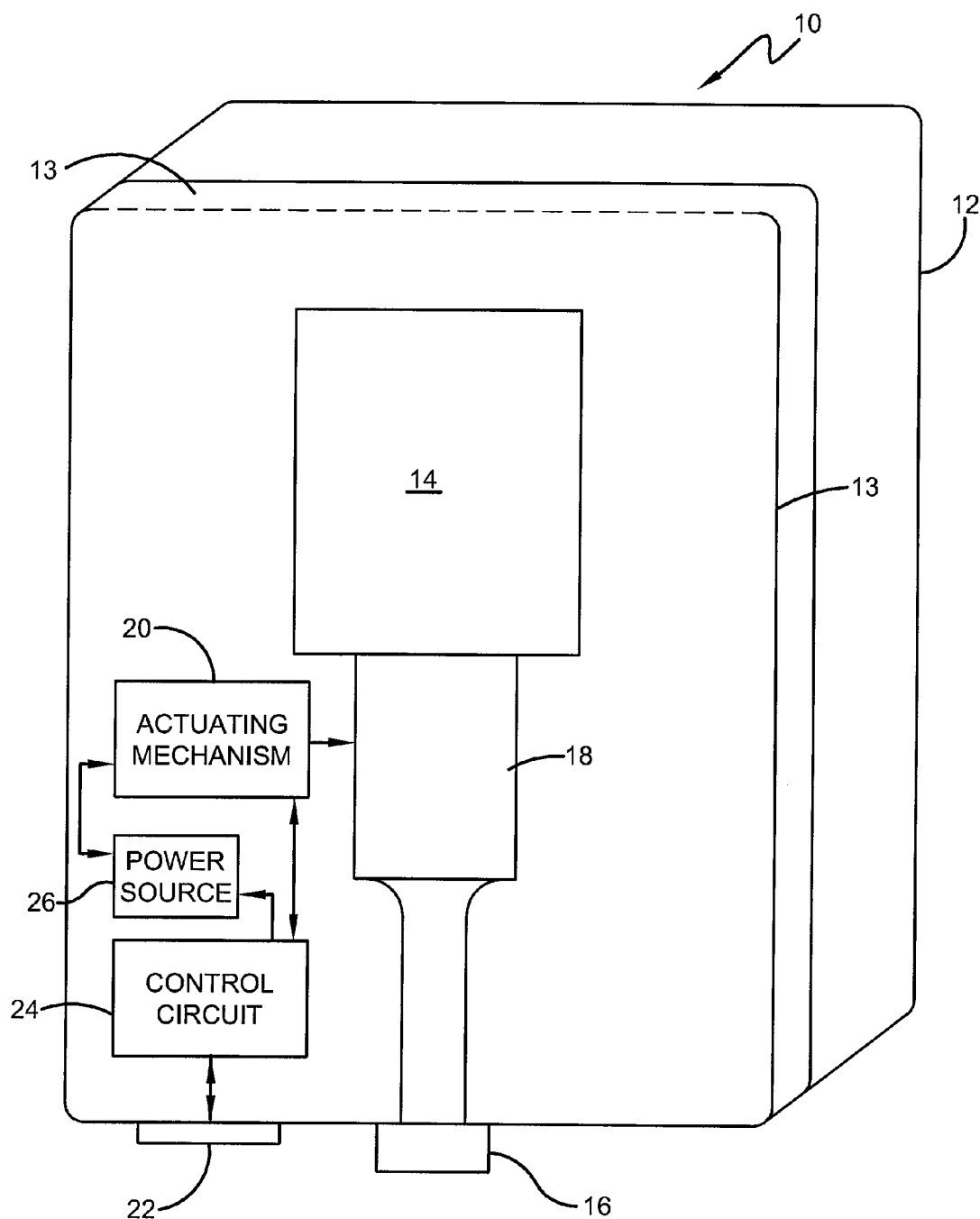
FIG. 1 is a schematic diagram of a dispenser made according to the concepts of the present invention, wherein a cover of the dispenser is shown in phantom to show the dispenser's internal components.

Referring now to the drawings and in particular to FIG. 1 it can be seen that a touch-free dispenser made in accordance with the concepts of the present invention is designated generally by the numeral 10. Although the concepts of the present invention are directed to a touch-free or hands-free dispenser, skilled artisans will appreciate that the present invention may also be utilized in any device which is battery operated or uses power from a source other than conventional mains power to power at least one electrical component. In any event, the dispenser 10 includes a housing 12 which provides a cover or door 13 that when open allows a technician to install or replace a refill container 14. The container 14, which may also be referred to as a cartridge, contains a fluid material such as a soap, a sanitizer or other material that is dispensed in measured amounts. Associated with the refill container 14 is a nozzle 16 which is a conduit from the container to an object receiving the fluid such as a user's hands or any other object upon which the fluid is dispensed. The dispenser 10 includes a pump mechanism 18 which is interposed between the container 14 and the nozzle 16. The mechanism 18 is coupled to an actuating mechanism 20 such as a motor or solenoid that actuates the pump mechanism.

A proximity sensor 22 is associated with the housing 12 and may be in the form of an infrared, sonic, or capacitive type sensor which detects the presence of an object or the user's hands. A control circuit 24 is carried by the housing and is connected to the proximity sensor 22, the actuating mechanism 20 and the pump mechanism 18. A power source 26, which will be discussed in further detail below, provides electrical power to the sensor 22, the control circuit 24, the pump mechanism 18 and the actuating mechanism 20. The power source 26 includes at least two batteries, which are also referred to as cells throughout the specification.

In general, the control circuit 24 is used to control the electrically powered components associated with the dispenser 10. This includes, but is not limited to the pump mechanism, the actuating mechanism, the sensor 22 and the control circuit 24. It will be appreciated that the features of the dispenser 10 are applicable to other devices that are not dispensers or that are not hands-free dispensers or devices. Indeed, the present invention may be utilized with any device that relies on batteries or cells for power for extended periods of time.

Figure 2:
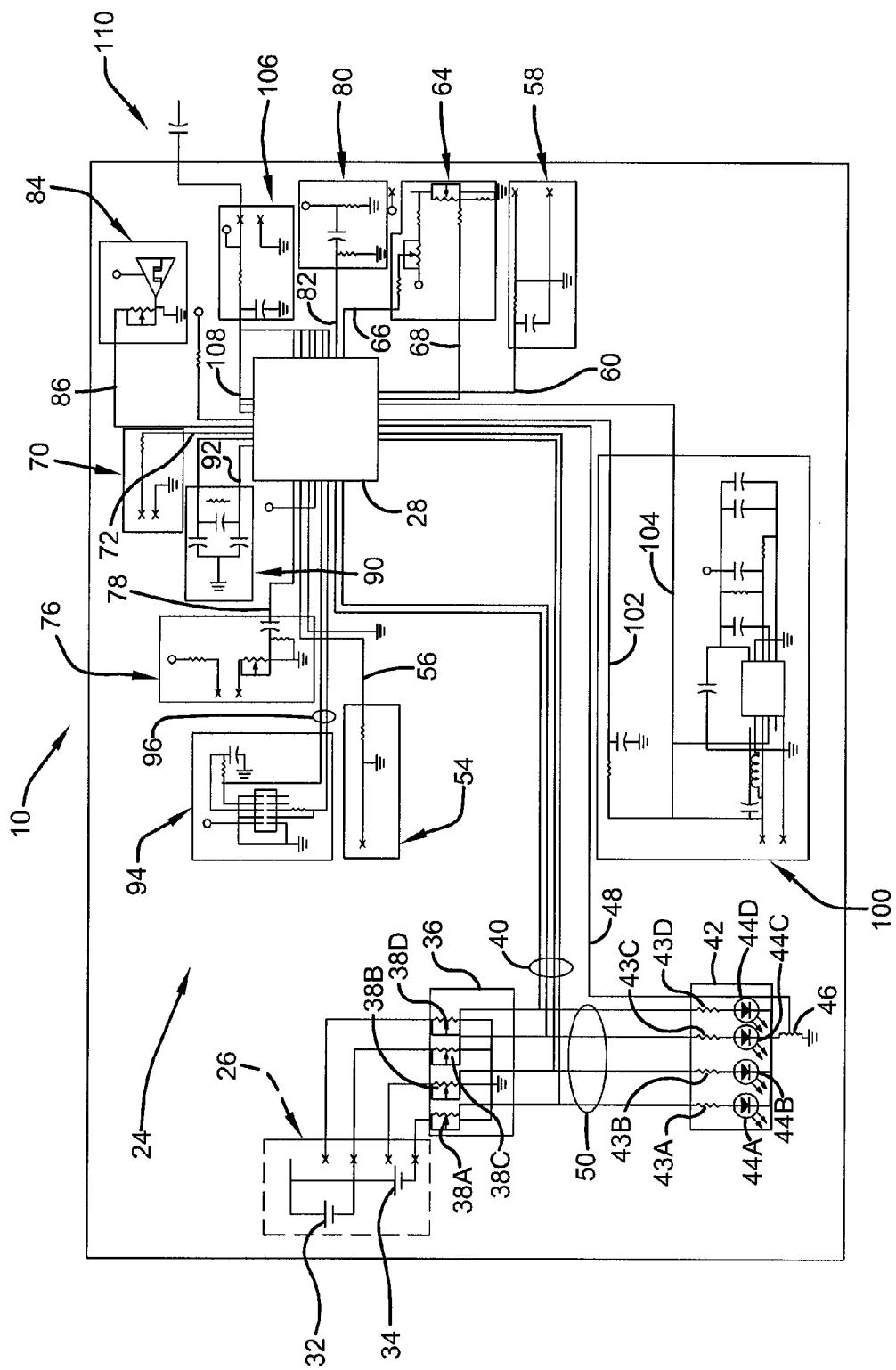
FIG. 2 is an electrical schematic diagram of a control circuit used by the dispenser according to the concepts of the present invention.

Referring now to FIG. 2 it can be seen that the dispenser 10 includes the control circuit 24. The control circuit 24 includes a controller 28 which generally receives input and generates output in conjunction with the other circuit components. The controller 28 provides the necessary hardware, software and memory for implementing the operational features of the control circuit 24 and the dispenser 10. In one embodiment, the controller may be Silicon Labs part number C8051F312. In the present embodiment, the controller 28 is a "native mode" device such as provided by Texas Instruments part number MSP430L092. Such a controller is advantageous in that it does not utilize an internal step-up in voltage. Native mode controllers are also advantageous in that their power requirements are significantly reduced. In any event, the present controller is configured to selectively allow charge to flow in both directions.

The power source 26, which may also be referred to as a battery bank, includes at least two batteries 32 and 34 that are connected in parallel. The term "battery" may refer to a cell wherein the cell means a battery, a solar panel or any other source of electrical power. It will be appreciated that there could be more than two different types of cells included in the power source which may be of the same type or of different types. Specifically, the cells could be a mix of an alkaline type, a nickel-metal hydride type, a heavy duty type, a AA battery, one C, one D, one AAA or any other such battery type with no loss of function of the control circuit and other components within the dispenser.

Interposed between the power source 26 and the controller 28 is a cell selection circuit 36 which assists in the selection of the battery to operate the control circuit 24 and related components of the dispenser. The selection circuit 36 includes a plurality of field effect transistors 38 A-D wherein each transistor 38 generates a corresponding selection signal 40 that is transmitted to the controller 28. It will be appreciated that each transistor 38 is associated with a corresponding cell that could be included in the battery bank and that two additional cells may be provided by the power source that are not shown in FIG. 2. In any event, the selection signals 40 are received by the controller 28 if the voltage levels of the associated cell are sufficient for the corresponding transistor 38. Insufficient charge levels, as indicated by the selection signals 40, are detected and processed accordingly by the controller 28.

A cell indicator circuit 42 is connected between the cell selection circuit 36 and the controller 28 wherein the circuit 42 indicates which cell has been depleted or not. The circuit 42 includes a plurality of resistors 43 provided with an appropriate suffix A-D that are connected to corresponding anodes of light emitting diodes (LEDs) 44 A-D. The other end of each resistor 43 is connected to the output of the corresponding FET 38 by an indicator line 50. Skilled artisans will appreciate that other lighting elements could be used in place of LEDs. Connected to the cathodes of LEDs 44 A-D is a transistor 46 which is operationally controlled by a transistor line 48 connected to the controller 28. In most embodiments, the transistor line 48 is energized when the cover 13 is open. Of course, other events could be used to generate a signal on the transistor line 48 such as an external pushbutton. In any event, when it is determined by the controller that a particular cell is depleted, the appropriate corresponding LED 44 is illuminated when the cover is opened. In the alternative, the LEDs 44 may illuminate if a corresponding cell still has adequate energy.

The controller circuit 24 includes a number of sub-circuits or features utilized to implement operation of the dispenser 10. In particular, a query circuit 54 generates a short range radio frequency signal upon receipt of a query signal 56 generated by the controller. This feature confirms the presence of a proper refill container in the dispenser housing. In the present embodiment, the refill container may be provided with indicia or other type of response signaling device that generates a reply signal in response to the RF signal. A confirmation circuit 58 detects the reply signal and generates a confirmation signal 60 that is received by the controller 28. In other embodiments, the confirmation circuit 58 may simply detect whether the refill container is present and/or whether it is a valid container or not. If the container is not approved, then the controller 28 does not allow operation of the other features of the dispenser.

A motor control circuit 64 is connected to the controller 28 and receives operational signals from the controller via a signal line 66. The circuit 64 provides a return signal line 68 so as to monitor operation of the motor. The circuit 64 energizes the motor which in turn operates the actuating mechanism 20 at the appropriate time and for the appropriate length of time depending upon the specific operational features of the dispenser.

A cam sensor circuit 70 is connected to the controller 28 and provides a detection of the motor and/or mechanism 20 position via a sensor signal line 72. The circuit 70 provides confirmation of the operational position of the motor or mechanism so as to ensure that the motor is turned off or that the mechanism is stopped at the appropriate time based upon the relative position of the cam associated therewith. In other words, the sensor circuit 70 is associated with a positional sensor coupled to a motor shaft of the motor or a feature of the mechanism 20 to detect a position thereof. If the circuit does not detect a proper position of the motor shaft and/or mechanism during or after a dispensing cycle, the controller 28 implements appropriate corrective action.

A proximity sensor circuit 76 is connected to the controller 28 wherein the controller generates a sensor signal 78 so as to initiate operation of an infrared or similar transceiver associated with the sensor 22. A receiver circuit 80 is also connected to the controller 28 when the sensor detects the presence of a return signal reflected by an object. That detection event is transmitted on a receiver signal line 82 to the controller. In other words, as the proximity sensor emits a signal, any return or reflected signals are detected by the circuit 80 and sent to the controller 28 for initiation of a dispense cycle. Skilled artisans will appreciate that the controller 28 generates the signal 78 in a predetermined manner to conserve battery power. For example, the signal 78 may operate the proximity sensor at a reduced periodic rate until an object is detected. The rate may then be increased for a period of time until such a time that an object is no longer detected.

A Hall switch 84 is connected to the controller 28 by a signal line 86. The Hall switch 84 is coupled to the cover 13 such that whenever the cover is opened an appropriate signal is generated. Upon detection of such a signal, the controller 28 generates the signal 48 which turns the transistor 46 on.

This enables illumination of the LEDs associated with the indicator circuit 42 so as to determine or show which cell has been depleted or not.

An oscillator circuit 90 is connected to the controller 28 by a signal line 92 to implement operation of the controller. As skilled artisans will appreciate, the oscillator circuit 90 provides the appropriate clock signal and clock signal rate, such as 32 kilohertz, so as to ensure operation of the controller. A programming header 94 is also connected to the controller 28 via header a signal line 96. The header 94 allows for a technician or factory personnel to adjust the software utilized by the controller for operation of the dispenser.

A boost regulator circuit 100 is connected to the controller 28 by a battery line 102 and a boost signal 104. A supercapacitor connection circuit 106 is also connected to the controller and receives input from the controller via a charge signal 108. A supercapacitor 110 is connected to the circuit 106 and holds a predetermined level of charge to run all of the electrically-powered dispenser components. Together, the boost regulator circuit 100, the connection circuit 106, and the controller 28 function to energize the supercapacitor and efficiently use the battery power provided.

At start-up, the regulator circuit 100, through the controller 28, selects the lowest voltage power cell available by monitoring the respective selection signals 40 to determine which cell or battery can provide a sufficient amount of power for the remainder of the circuit. The circuit 100 then uses the selected battery, via the battery line 102, to charge the supercapacitor 110 via the boost signal 104, through the controller 28, the charge signal 108 and the circuit 106 until a desired charge level is obtained. Afterwards, the controller 28 takes over operation of the circuit and determines how much further to charge the supercapacitor and then the boost regulator circuit is placed in a dormant condition. The controller 28 is programmed to periodically check the voltage status of the supercapacitor every five minutes or other selected period of time. The controller 28 may also be programmed to check the voltage status of the supercapacitor 110 after each dispensing cycle. If the controller 28 determines during one of these checks that the supercapacitor has an insufficient charge value, then the controller 28 goes into an active condition and the regulator circuit 100 re-energizes the supercapacitor via the boost signal 104 and the charge signal 108. In the event a dispense cycle is initiated and the charge on the supercapacitor is insufficient, then the selected battery in the power source 26 operates the dispenser 10 directly through the controller. If the selected battery can still provide power, but an amount insufficient to operate the dispenser, the regulator circuit 100 attempts to charge the supercapacitor. Once the selected battery is fully depleted, the controller 28 then selects the next usable battery with the lowest voltage value as described above. With the above described configuration, skilled artisans will appreciate that the dispenser 10 is able to operate off of a single cell or battery or more specifically, the supercapacitor. In the present embodiment, the dispenser draws about 200 µ watts to power all of the current-drawing components in stand-by mode and about two Joules (2 watts/second) during a dispensing event.

Based on the foregoing, the advantages of the present invention are readily apparent. The dispenser is able to operate off of any type of battery. This allows simplification of the battery configuration and a space savings. Moreover, a battery with a partial charge is not disposed of until fully depleted. This allows for battery servicing/replacement to be coordinated with regular refill container replacement. The dispenser is also advantageous in that cells are identified as having an adequate or inadequate voltage value when the door cover is open.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An electrically powered device, comprising:
   at least one electrically powered component;
   a power source comprising at least two cells, wherein at least one cell powers said electrically powered component and the remaining cells are held in reserve; and
   a control circuit connected to said at least one electrically powered component and said power source, said control circuit comprising:
   a controller generating a charge signal;
   a boost regulator circuit connected to said controller and receiving power from said power source and generating a boost signal received by said controller for conversion into said charge signal;
   a supercapacitor connected to said controller and directly receiving said charge signal therefrom, said supercapacitor providing a predetermined voltage to said at least one electrically powered component; and
   a cell selection circuit connected between said power source and said controller, wherein said controller generates selection signals received by said cell selection circuit to connect whichever one of said at least two cells has the lowest voltage to said boost regulator circuit which causes said boost regulator circuit to charge said supercapacitor to directly power said at least one electrically powered component, wherein said boost regulator circuit and said controller monitoring said power source and drawing power from at least one of said remaining cells held in reserve when said one cell is fully depleted and wherein said controller and said boost regulator circuit are interposed between said power source and said supercapacitor and wherein said controller and said selection signals select the lowest operational voltage cell available.

2. The device according to claim 1, wherein said at least two cells are of different types and sizes selected from the group consisting of alkaline, NiMH, AA, AAA, C and D.

3. The device according to claim 1, wherein said at least two cells are connected in parallel.

4. The device according to claim 1, further comprising:
   a housing adapted to receive a fluid refill container, wherein said at least one electrically powered component assists in dispensing fluid from said fluid refill container.

5. The device according to claim 4, further comprising:
   a cell indicator circuit comprising a light element associated with each said cell and connected to said controller, said light element indicating whether said associated cell is depleted or not.

6. The device according to claim 5, further comprising:
   a cover associated with said housing; and
   a cover switch coupled to said cover and connected to said controller, said controller illuminating said light element depending on whether said associated cell is depleted or not.

7. The device according to claim 1, wherein said supercapacitor has a value greater than 1 Farad, wherein said supercapacitor powers said at least one electrically powered device.

8. The device according to claim 7, wherein said power source powers said electrically powered component in the event said supercapacitor has insufficient charge.

9. The device according to claim 1, wherein said controller uses said selected cell, through said boost regulator circuit, to charge said supercapacitor until a desired charge level is obtained.

10. The device according to claim 1, wherein said controller periodically checks a charge value of said supercapacitor and if an insufficient charge value is detected then said boost regulator recharges said supercapacitor.

11. The device according to claim 1, wherein said boost regulator circuit is controlled only by said controller and output of said boost regulator circuit is only received by said controller.

\* \* \* \* \*